United States Patent [19]

Belforte et al.

[11] 4,404,630
[45] Sep. 13, 1983

[54] DATA-EXTRACTION CIRCUITRY FOR PCM COMMUNICATION SYSTEM

[75] Inventors: Piero Belforte; Renzo Bortignon, both of Turin, Italy

[73] Assignee: CSELT-Centro Studi e Laboratori Telecommunicazioni S.p.A., Turin, Italy

[21] Appl. No.: 235,947

[22] Filed: Feb. 19, 1981

[30] Foreign Application Priority Data

Feb. 20, 1980 [IT] Italy .................. 67259 A/80

[51] Int. Cl.³ .................. H04Q 11/04; H04J 3/14
[52] U.S. Cl. .................. 364/200; 371/20; 371/22; 375/10
[58] Field of Search ... 364/200 MS File, 900 MS File; 371/15, 20, 22; 375/10, 25, 26

[56] References Cited

U.S. PATENT DOCUMENTS

| | | | |
|---|---|---|---|
| 3,867,579 | 2/1975 | Colton et al. | 364/900 |
| 3,959,588 | 5/1976 | Kelly et al. | 375/25 |
| 3,965,294 | 6/1976 | Renz et al. | 375/10 |
| 4,001,559 | 1/1977 | Osborne et al. | 371/20 |
| 4,002,834 | 1/1977 | Cocci et al. | 375/25 |
| 4,005,274 | 1/1977 | Vagliani et al. | 375/26 |
| 4,009,349 | 2/1977 | Belforte et al. | 179/15 AT |
| 4,059,729 | 11/1977 | Eddy et al. | |
| 4,059,736 | 11/1977 | Perucca et al. | 364/200 |
| 4,099,668 | 7/1978 | Feilchenfeld et al. | 371/20 |
| 4,163,210 | 7/1979 | Giraud | 371/22 |
| 4,174,805 | 11/1979 | Fulks et al. | 371/20 |
| 4,333,159 | 6/1982 | Bigall et al. | 364/900 |

FOREIGN PATENT DOCUMENTS

| | | |
|---|---|---|
| 2455235 | 5/1975 | Fed. Rep. of Germany . |
| 1470702 | 4/1977 | United Kingdom . |
| 1523653 | 9/1978 | United Kingdom . |
| 2005962 | 4/1979 | United Kingdom . |

Primary Examiner—Mark E. Nusbaum
Assistant Examiner—Gary V. Harkcom
Attorney, Agent, or Firm—Karl F. Ross

[57] ABSTRACT

Incoming and outgoing lines on opposite sides of a PCM coupling network, each carrying a recurrent frame with a multiplicity of 8-bit channels which are to be individually tested, have branches extending to an input-side data extractor and an output-side data extractor of substantially identical construction co-operating with a control device such as a microprocessor serving to compare the data extracted in a given time slot from an incoming line with those extracted in a corresponding time slot from an outgoing line coupled thereto. Each extractor, realized in integrated circuitry, comprises a multiplexer for selecting one of the associated lines, a register storing the identity of the line to be selected, and presettable counters stepped by a time base synchronized with the PCM system for enabling the loading of an output register by the multiplexer at the instant when a byte of the desired channel appears on the chosen line. The line-identifying register and the presettable counters are loaded with numerical data from the control device with the aid of several cascaded decoders responsive to instruction from that device.

7 Claims, 2 Drawing Figures

DATA-EXTRACTION CIRCUITRY FOR PCM COMMUNICATION SYSTEM

FIELD OF THE INVENTION

Our present invention relates to a pulse-code-modulation or PCM communication system in which a control device such as a microprocessor operates on data of a selected multibit channel forming part of a multichannel frame, with several such frames appearing simultaneously on respective transmission lines. More particularly, our invention concerns a diagnostic circuit arrangement for extracting the data bits of a selected channel from a designated line for analysis by the associated control device.

BACKGROUND OF THE INVENTION

A data extractor of the type referred to is useful, for example, in cases where a microprocessor checks on the performance of a PCM coupling network inserted between a set of incoming lines and a set of outgoing lines each carrying a group of channels in a respective frame. For this purpose it is necessary to compare the data appearing in a given time slot on an incoming line with those appearing in a corresponding time slot on an outgoing line temporarily coupled thereto. Since the intervening coupling network generally introduces a certain delay, normally amounting to a small number of frame periods, an input-side data extractor and an output-side data extractor must operate in a correlated manner with the same relative delay.

OBJECTS OF THE INVENTION

An important object of our present invention is to provide a data extractor, responsive to instructions from an associated control device, which is of simple and readily integratable structure and can be easily adapted for use with various sections of a PCM communication system.

A more particular object is to provide a data extractor of this character which can be indifferently used on the input side and on the output side of a coupling network establishing temporary connections between respective incoming and outgoing lines.

SUMMARY OF THE INVENTION

A data extractor embodying our invention comprises a multiplexer with data inputs respectively connected to the lines served thereby and with an output connection extending to the associated control device, this connection including a normally blocked first data store preferably designed as a series-parallel register. The multiplexer further has a switching input connected to an output of a second data store receiving line-identifying data from the control device. A source of timing pulses, coinciding with the time slots of a frame period assigned to respective PCM channels, can be connected—in response to a starting command from the control device—to resettable counting means for unblocking the first data store at the instant when the time slot assigned to the selected channel appears on the designated line. Circuitry connected to the control device serves for loading the second data store with a line-identifying first numerical code and for presetting the counting means with a second numerical code representing the position of the selected channel in its frame.

Pursuant to a more particular feature of our invention, the presettable counting means may comprise a channel counter in cascade with a frame counter, the latter being presettable with a third numerical code for introducing a delay of one or more frames between the start of a channel test and the actual extraction of the corresponding data bits. Such a delay will be needed, in the case of a data extractor connected to the output side of a coupling network, for the purpose of verifying the identity of a data word appearing on an outgoing line with that previously recovered by a similar input-side extractor from a corresponding channel on an incoming line.

The circuitry used for loading the presettable counter or counters and the second data store with channel-identifying and line-identifying data may comprise a plurality of cascaded decoders responsive to instructions from the control device such as input/output requests (IORQ), read/write signals (RW), and discriminating bits (DC) distinguishing data messages from command messages.

BRIEF DESCRIPTION OF THE DRAWING

The above and other features of our invention will now be described in detail with reference to the accompanying drawing in which.

SPECIFIC DESCRIPTION

Figure 1:
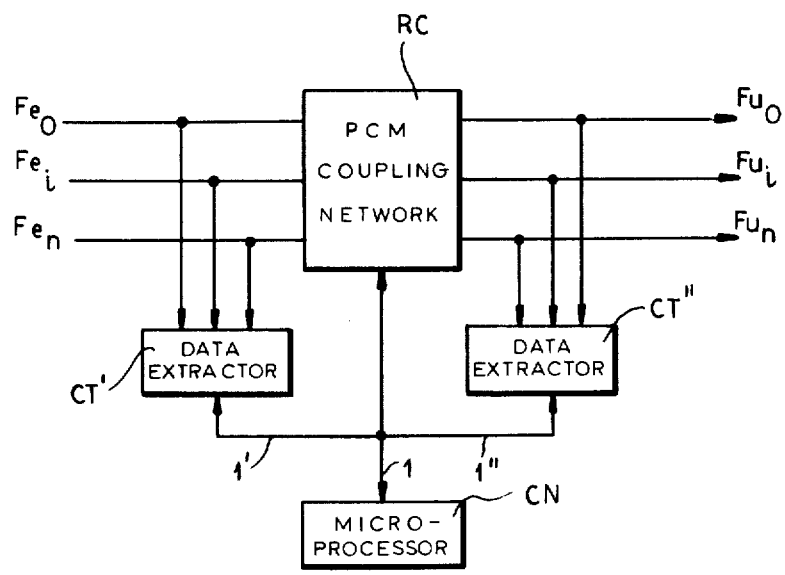
FIG. 1 is a block diagram of a diagnostic circuit arrangement embodying our invention, including two data extractors on opposite sides of a PCM coupling network.

In FIG. 1 we have shown part of a PCM communication system with a multiplicity of incoming lines $Fe_O$ . . . $Fe_i$ . . . $Fe_n$ and a like multiplicity of outgoing lines $Fu_O$ . . . $Fu_i$ . . . $Fu_n$ which are selectively interconnectable by a conventional binary coupling network RC. A microprocessor CN controls the operation of network RC through a two-way multiple 1 with branches 1' and 1" respectively extending to an input-side data extractor CT' and an output-side data extractor CT". Extractors CT' and CT" each have a multiplicity of inputs connected to respective branches of the corresponding set of lines $Fe_O$-$Fe_n$ and $Fu_O$-$Fu_n$.

Figure 2:
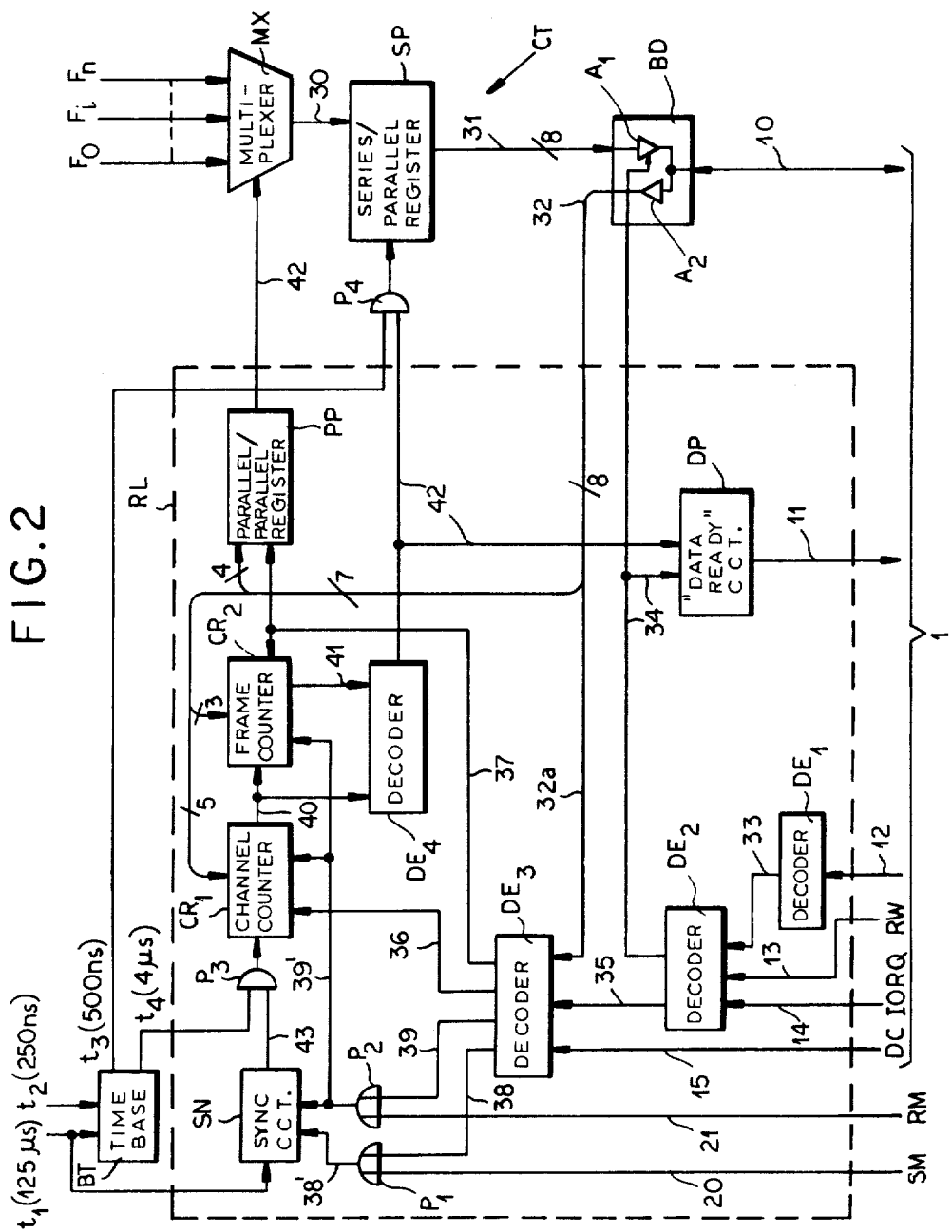
FIG. 2 is a detailed diagram of a data extractor representative of those shown in FIG. 1.

FIG. 2 shows a data extractor CT representative of either of the two extractors CT', CT" illustrated in FIG. 1. A multiplexer MX with n data inputs $F_O$ . . . $F_i$ . . . $F_n$ has an output lead 30 extending to a normally blocked series/parallel register SP from which an 8-lead multiple 31 (conventionally indicated by a short slanting stroke and a juxtaposed numeral 8) extends to a transmitting section $A_1$ of a transceiver BD also including a receiving section $A_2$. Each of these two sections consists of eight parallel amplifiers connected to respective leads of a bus 10 which forms part of the two-way multiple 1 extending to the microprocessor CN of FIG. 1. Other connections 11–15 included in that multiple will be further discussed hereinafter.

Multiplexer MX has a switching input 42 connected to an output of a parallel/parallel register PP with a data input joined to four leads of an 8-lead multiple 32 extending from receiving amplifier $A_2$. Three other leads of that multiple terminate at presetting inputs of respective stages of a frame counter $CR_2$ while an eighth lead 32a extends to an input of a decoder $DE_3$. Five leads of multiple 32 also extend to presetting inputs of respective stages of a channel counter $CR_1$ in cascade with counter $CR_2$. The 5-stage counter $CR_1$ and the 3-stage counter $CR_2$ could be integrated into a single 8-stage counter whose contents would consist of five lower-ranking bits counting the channels and three higher-ranking bits counting the frames.

Decoder $DE_3$ lies in cascade with two other decoders $DE_1$ and $DE_2$, the former receiving via connection 12 an identification code designating the extractor CT as the one for which messages emitted by the microprocessor are intended. This is particularly important when several pairs of data extractors CT', CT" associated with the same microprocessor CN serve different sections of the network RC shown in FIG. 1; as a result, only minor modifications of device CN will be needed when the network is expanded and further extractor pairs are added.

An output lead 33 extends from decoder $DE_1$ to an input of decoder $DE_2$ having two other inputs respectively connected to leads 13 and 14 over which a read/write signal RW and an input/output request IORQ are sent out by microprocessor CN in the course of a channel test as described hereinafter. When the binary signal on lead 13 is of such nature as to constitute together with signal IORQ a writing command, decoder $DE_2$ energizes an output lead 35 extending to decoder $DE_3$ which is thereby enabled to distinguish between bits "0" and "1" on lead 32a as well as between binary values of a signal DC on lead 15 which discriminates between data messages and command messages arriving from the bus 10 by way of receiving section $A_2$. Another output lead 34 of decoder $DE_2$ is energized when signals RW and IORQ constitute a reading command to activate the normally deactivated transmitting section $A_1$ and to reset a flip-flop DP emitting in its set state a "data ready" signal on lead 11.

Decoder $DE_1$ and connections 12, 33 could be omitted if signal IORQ is of the multibit type incorporating the identification code referred to above.

Decoder $DE_3$ has an output lead 36 terminating at an enabling input of counter $CR_1$, a second output lead 37 terminating at respective enabling inputs of counter $CR_2$ and register PP, and two further output leads 38, 39 extending to respective inputs of a pair of OR gates $P_1$ and $P_2$ having other inputs respectively connected to a pair of leads 20 and 21 to which a starting command SM and a resetting command RM may be manually applied for the purpose of checking on the operation of data extractor CT. An output lead 38' of OR gate $P_1$ extends to an enabling input of a synchronizing circuit SN whereas an output lead 39' of OR gate $P_2$ extends to an inhibiting input of circuit SN as well as to clearing inputs of counters $CR_1$ and $CR_2$.

A time base BT receives trains of synchronizing pulses $t_1$ and $t_2$ from a nonillustrated master clock controlling the operation of microprocessor CN and other parts of the PCM system. Pulses $t_1$ recur at the usual sampling rate of 8 kHz corresponding to a frame period of 125 $\mu$s. Pulses $t_2$ have a cadence corresponding to a recurrence period of 250 ns which equals twice the bit frequency in a system of 32 channels per frame with each channel encompassing an 8-bit word or byte per time slot. Time base BT derives from these incoming pulses two outgoing pulse trains, namely pulses $t_3$ recurring at the bit rate with a period of 500 ns and pulses $t_4$ recurring at the channel frequency with a period of 4 $\mu$s. Frame-timing pulses $t_1$ are also fed to an input of sync circuit SN which, on being enabled by a starting signal SM on lead 38', permanently energizes a lead 43 tied to an input of an AND gate $P_3$ whose other input receives the channel-timing pulses $t_4$ from time base BT. AND gates $P_3$ works into a stepping input of channel counter $CR_1$ from whose full-count output a connection 40 extends to a stepping input of frame counter $CR_2$ as well as to one input of a decoder $DE_4$ having another input linked through a connection 41 to a full-count output of counter $CR_2$. An output lead 42 of decoder $DE_4$ extends on the one hand to a setting input of "Data Ready" circuit DP and on the other hand to an AND gate $P_4$ also receiving the bit-timing pulses $t_3$ from time base BT; AND gate $P_4$ works into an input of register SP enabling that register to receive a series of eight bits from output lead 30 of multiplexer MX and to deliver them in parallel via multiple 31 to data-transmitting section $A_1$.

Operation

As long as sync circuit SN is not disabled by a resetting signal RM on lead 39', the cascaded counters $CR_1$ and $CR_2$ will be continuously stepped by the pulses $t_4$ and will activate the decoder $DE_4$ when connections 40 and 41 are simultaneously energized upon the arrival of both counters in their terminal state. While this will periodically unblock the register SP for the duration of a time slot, the emission of corresponding bytes via multiple 31 and bus 10 to the microprocessor CN will be prevented as long as data transmitter $A_1$ is not activated by a writing command.

When the program of the microprocessor calls for the testing of the $m^{th}$ channel of a designated line, data extractor CT is addressed by its identification code on connection 12 accompanied by a writing signal RW on lead 13 and an input/output request IORQ on lead 14; each of these latter two signals may be represented by a logical "1". Decoder $DE_2$, enabled by voltage on lead 33, thereupon energizes its output lead 35 to activate the decoder $DE_3$ which recognizes the signal DC on lead 15 as having a logical value "1", thus indicating that an accompanying message on multiple 32 has the character of a command. Such a message generally consists of eight bits appearing on respective leads of multiple 32, the least-significant bit being present on lead 32a. Since the latter lead is the only one extending to decoder $DE_3$, the state of the other seven leads at this instant is immaterial.

The first message arriving from microprocessor CN at receiving section $A_2$ is a resetting command characterized by a bit "0" on lead 32a. In response to this bit, decoder $DE_3$ energizes its output lead 39 whose extension 39' inhibits the sync circuit SN and clears the counters $CR_1$ and $CR_2$. Next, the microprocessor sends out a data message which is characterized by a discriminating bit "0" on lead 15; this message identifies the channel to be tested and has the format $$c_1 c_2 c_3 c_4 c_5 XXO$$

where bits $c_1-c_5$ are carried on the five leads of multiple 32 terminating at the presetting inputs of counter $CR_1$ while the final bit "0" represents the state of energization of lead 32a detected by decoder $DE_3$, the state ("X") of the two remaining leads being immaterial. In response thereto, the decoder energizes its output lead 36 in lieu of lead 39 to enable the loading of counter $CR_1$ with the channel code $c_1-c_5$ having the numerical value 32-m.

Immediately thereafter, the microprocessor emits another data message of the format $$f_1f_2f_3f_4r_1r_2r_3 1$$

where $f_1-f_4$ is a numerical code identifying the designated line, $r_1-r_3$ is another numerical code representing a delay d (in terms of up to seven frame periods) to be observed before the extraction of the first byte from the selected line and channel, and the final bit "1" is the new state of energization of lead 32a. Decoder DE₃ responds to this new state in switching from lead 36 to lead 37 so as to enable the register PP to store the line code $f_1-f_4$ appearing on the four leads of multiple 32 which terminate at its data input while counter CR₂ receives the frame code $r_1-r_3$ on the three leads of that multiple terminating at its presetting inputs. The code fed to counter CR₂ has a numerical value of 7-d which will be 7 (d=0) when the data extractor here considered is the input-side unit CT' of FIG. 1. Under these circumstances, therefore, counter CR₂ is immediately placed in its terminal state in which its full-count output tied to connection 41 is energized.

Microprocessor CN now emits a further message constituting a starting command. With bit DC on lead 15 again having the logical value "1" to indicate the command character of this message, decoder DE₃ detects a bit "1" on lead 32a which causes it to energize lead 38 to the exclusion of all its other output leads. Voltage on the extension 38' of that lead now reactivates the sync circuit SN, making it receptive to the arrival of the first frame-timing pulse $t_1$ for unblocking the AND gate P₃.

Counter CR₁, already preloaded with a numerical value 32-m, reaches its full count of 32 upon being stepped by m consecutive pulses $t_4$ and thus energizes its output connection 40. In the case of input-side extractor CT', frame counter CR₂ is already at its full count of 7 so that its output connection 41 is also energized; decoder DE₄ (which could be a simple AND gate connected to all eight counter stages) thereupon emits a signal on lead 42 which lasts for one time slot and opens the AND gate P₄ for the passage of bit-timing pulses $t_3$ whereby the data bits then appearing on the designated line—selected by multiplexer MX in response to the contents of register PP—are serially entered in respective stages of register SP connected to the leads of multiple 31. On the trailing edge of the output signal of decoder DE₄, i.e. upon the storing of the entire byte in register SP, flip-flop DP is set to emit a "data ready" signal on lead 11 to microprocessor CN.

As the stepping of counter CR₁ by pulses $t_4$ continues, the activation of decoder DE₄ recurs in the same time slot of every eighth frame period as counter CR₂ takes one step every time counter CR₁ leaves its 32nd position. (The positions of counter CR₁, like the channels identified thereby, are designated 1 through 32 whereas those of counter CR₂, corresponding to the number of delaying frame periods, are designated 0 through 7.) Thus, the contents of register SP are updated once every millisecond.

Upon receiving the "data ready" signal on lead 11, microprocessor CN emits a reading command consisting of signal IORQ on lead 14 accompanied by a modified signal RW on lead 13, here specifically a logical "0". Decoder DE₂, still enabled by the identification code fed via connection 12 to decoder DE₁, de-energizes the lead 35 to disable the decoder DE₃ and energizes instead its output lead 34 which resets the flip-flop DP and activates the transmitting section A₁ of transceiver BD whereby the byte last stored in register SP is delivered via bus 10 to the microprocessor for evaluation, specifically for comparison with a byte recovered substantially concurrently by the other data extractor of FIG. 1.

The operation of data extractor CT" differs from that of its mate CT' only in that the code fed into the presetting inputs of frame counter CR₂ has a value other than 7 to indicate a finite number d of up to 7 frame periods by which the extraction of a byte from an outgoing line must be delayed with reference to the time slot in which data are extracted by unit CT' from the incoming line communicating therewith via network RC; this assumes, of course, that the starting command is emitted simultaneously to both extractors CT' and CT". The contents of register SP of extractor CT" will also be updated 1,000 times per second, but always with the proper delay relative to the bits then stored in the same register of extractor CT'. In order to check the identity of corresponding bytes entered in the respective registers SP, a comparator in the microprocessor may receive the bits from unit CT' with a like delay relative to those read out from unit CT".

For a manual testing of the extractor CT shown in FIG. 2, leads 21 and 20 may be consecutively energized with the externally generated resetting command RM and starting command SM. Since in that instance there will be no preloading of counters CR₁ and CR₂, the "data ready" signal on lead 11 will appear at the end of the 32nd time slot of the eighth frame period following the generation of signal SM.

The data extractor CT, and especially its elements DE₁-DE₄, CR₁, CR₂, P₁-P₃, SN, DP and PP shown encompassed in a logic network RL, may be readily realized by modular integrated circuitry and may include about a thousand active components altogether. With a maximum operating frequency of 4 MHz corresponding to the cadence of pulse train $t_2$, and with an 8-lead data bus 10, the module is compatible with commercially available microprocessors.

We claim:

1. In a pulse-code-modulation communication system wherein a plurality of lines carry respective frames each composed of a multiplicity of multibit channels assigned to different time slots of a recurrent frame period, the combination therewith of a data extractor delivering data bits of a selected channel from a designated line to a control device, said data extractor comprising:

a multiplexer with data inputs respectively connected to said lines and with an output connected to said control device via a normally inoperative data transmitter;

a normally blocked first data store in said output connection;

a second data store with an output connected to a switching input of said multiplexer;

a source of timing pulses coinciding with said time slots;

presettable counting means connectable to said source in response to a starting command from said control device for stepping by said timing pulses into a terminal state reached at an instant when a time slot assigned to the selected channel appears on the designated line, said counting means unblocking said first data store in said terminal state;

circuitry connected to said control device for loading said second data store with a first numerical code identifying the designated line and for presetting said counting means with a second numerical code representing the position of the selected channel in the corresponding frame, said numerical codes being available at an input connection emanating from said control device, said circuitry including decoding means for supplying said numerical codes from said input connection to said counting means and to said second data store in response to a writing command from said control device, said decoding means being responsive to a reading command from said control device for activating said data transmitter; and signal-transmitting means responsive to the attainment of said terminal state by said counting means for informing said control device of the availability of extracted data in said first data store, preparatorily to the emission of said reading command by said control device.

2. The combination defined in claim 1 wherein said decoding means comprises a plurality of cascaded decoders including a first decoder adapted to detect an identification code assigned to said data extractor, a second decoder enabled by said first decoder in the presence of said identification code to recognize said reading and writing commands and to disable said signal-transmitting means with concurrent activation of said data transmitter in response to said reading command, and a third decoder enabled by said second decoder in the presence of said writing command to recognize a discriminating signal from said control device distinguishing between command messages and data messages arriving over said input connection, said command messages including said starting command and a preceding resetting command causing said counting means to be cleared, said data messages containing said numerical codes.

3. The combination defined in claim 2 wherein said first data store is a series/parallel register.

4. The combination defined in claim 2 wherein said source includes a synchronizing circuit with an inhibiting input and an enabling input respectively energized by said third decoder in response to said resetting command and to said starting command by way of respective OR gates which are also connected to manually energizable test leads.

5. The combination defined in claim 2, 3 or 4 wherein said counting means includes a channel counter in cascade with a frame counter, said channel counter being presettable with said first numerical code, said frame counter being presettable with a third numerical code forming part of one of said data messages for delaying the unblocking of said second data store by a selected number of frames following the reception of said starting command.

6. The combination defined in claim 5 wherein said data extractor is one of two circuit components of identical structure, the multiplexer of one of said components having said data inputs respectively connected to a set of incoming lines, the multiplexer of the other of said components having said data inputs respectively connected to a set of outgoing lines that are selectively connectable to said incoming lines by an intervening PCM coupling network, said control device being a microprocessor controlling the operation of said coupling network.

7. The combination defined in claim 1, 2, 3 or 4 wherein said data extractor is an integrated-circuit module.

* * * * *